United States Patent [19]

Kanota

[11] Patent Number: 5,502,569
[45] Date of Patent: Mar. 26, 1996

[54] APPARATUS AND METHOD FOR RECORDING DIGITAL VIDEO SIGNALS

[75] Inventor: Keiji Kanota, Kanagawa, Japan

[73] Assignee: Sony Corporation, Tokyo, Japan

[21] Appl. No.: 911,488

[22] Filed: Jul. 10, 1992

[30] Foreign Application Priority Data

Jul. 19, 1991 [JP] Japan .................................... 3-203484

[51] Int. Cl.⁶ .............................. H04N 9/79; G11B 5/00
[52] U.S. Cl. .......................................... 358/310; 360/32
[58] Field of Search ...................... 358/335, 310, 358/342, 135, 136, 133; 360/33.1, 72, 32; 348/384, 398, 420, 421

[56] References Cited

U.S. PATENT DOCUMENTS

| | | | |
|---|---|---|---|
| 4,463,387 | 7/1984 | Hashimoto et al. | 358/310 |
| 4,849,812 | 7/1989 | Borgers et al. | |
| 4,910,605 | 3/1990 | Sasaki et al. | 358/310 |
| 5,111,283 | 5/1992 | Nagasawa et al. | 358/41 |
| 5,140,437 | 8/1992 | Yonimitsu et al. | 358/342 |
| 5,175,631 | 12/1992 | Juri et al. | 358/335 |
| 5,253,122 | 10/1993 | Chiba et al. | 360/33.1 |

FOREIGN PATENT DOCUMENTS

| | | |
|---|---|---|
| 0469861 | 2/1992 | European Pat. Off. . |
| 0469860 | 2/1992 | European Pat. Off. . |
| 0490799 | 6/1992 | European Pat. Off. . |

OTHER PUBLICATIONS

Philips Journal of Research, vol. 44, No. 2/3, July 1989, Eindhoven nl pp. 345–364, XP000053343, Peter De With 'Motion–Adaptive Intraframe Transform Coding of Video Signals' p. 347, last paragraph—p. 348, paragraph 1 p. 361, paragraph 2, figure 2.

Primary Examiner—Tommy P. Chin
Assistant Examiner—Robert Chevalier
Attorney, Agent, or Firm—William S. Frommer; Alvin Sinderbrand

[57] ABSTRACT

In a digital VCR having a plurality of magnetic heads for recording digital video signals in slant tracks on a magnetic tape, a recording circuit divides a digital input video signal into data blocks and performs an orthogonal transformation, such as the discrete cosine transform, in order to compress the data. The resulting blocks of coefficient data are recorded so that all coefficient data of a given block are recorded together by one of the magnetic heads on a single track. In this way, propagation of errors caused by head clogging or drop-outs is prevented.

17 Claims, 6 Drawing Sheets

Fig. 2A
(PRIOR ART)

| SEGMENT 0 | 0 2 1 3 ······ 1 3<br>1 3 0 2 ······ 0 2<br>⋮<br>1 3 0 2 ······ 0 2 |
|---|---|
| SEGMENT 1 | 2 0 3 1 ······ 3 1<br>3 1 2 0 ······ 2 0<br>⋮<br>3 1 2 0 ······ 2 0 |
| SEGMENT 2 | 0 2 1 3 ······ 1 3<br>1 3 0 2 ······ 0 2<br>⋮<br>1 3 0 2 ······ 0 2 |
| SEGMENT 3 | 2 0 3 1 ······ 3 1<br>3 1 2 0 ······ 2 0<br>⋮<br>3 1 2 0 ······ 2 0 |
| SEGMENT 4 | 0 2 1 3 ······ 1 3<br>1 3 0 2 ······ 0 2<br>⋮<br>1 3 0 2 ······ 0 2 |

Fig. 2B
(PRIOR ART)

| SEGMENT 0 | 0 1 0 1 ······ 0 1<br>1 0 1 0 ······ 1 0<br>⋮<br>0 1 0 1 ······ 0 1 |
|---|---|
| SEGMENT 1 | 1 0 1 0 ······ 1 0<br>0 1 0 1 ······ 0 1<br>⋮<br>1 0 1 0 ······ 1 0 |
| SEGMENT 2 | 0 1 0 1 ······ 0 1<br>1 0 1 0 ······ 1 0<br>⋮<br>0 1 0 1 ······ 0 1 |

APPARATUS AND METHOD FOR RECORDING DIGITAL VIDEO SIGNALS

BACKGROUND OF THE INVENTION

1. Field of the Invention

This invention relates to a method and apparatus for recording digital video signals on a magnetic tape by means of a plurality of magnetic heads disposed on a rotating drum, and more particularly is directed to compression coding of the digital video signals by transform encoding.

2. Description of the Prior Art

A D1 format component type digital VCR and a D2 format composite type digital VCR have been developed for use by broadcasting stations in digitizing color video signals and recording the digitized signals on a recording medium, such as a magnetic tape. In the D1 format digital VCR, a luminance signal and first and second color difference signals are A/D converted with sampling frequencies of 13.5 MHz and 6.75 MHz, respectively. Thereafter, the signals are suitably processed and then recorded on a tape. Since the ratio of sampling frequencies of the signal components is 4:2:2, this system is usually referred to as the 4:2:2 system.

On the other hand, in the D2 format video digital VCR, a composite video signal is sampled with a signal having a frequency four times higher than the frequency fsc of a color subcarrier signal and then is A/D converted. Thereafter, the resultant signal is suitably processed and then recorded on a magnetic tape.

Since these known D1 and D2 format digital VCRs are designed for professional use, for example in broadcasting stations, the attainment of high picture quality is given top priority in the design and construction of such VCRs, and the weight and size of the apparatus is not overly important.

In these known digital VCRs, the digital color video signal, which results from each sample being A/D converted into, for example, 8 bits, is recorded without being substantially compressed. As an example, when the known D1 format digital VCR A/D converts each sample into 8 bits with the frequencies noted above, the data rate representing the color video signal is approximately 216 Mbps (megabits per second). When the data in the horizontal and vertical blanking intervals are removed, the number of effective picture elements of the luminance signal per horizontal interval and the number of effective picture elements of each color difference signal per horizontal interval becomes 720 and 360, respectively, as shown in FIG. 1A. In the NTSC system (525/60), the number of valid scanning lines for each field is 250, and the valid video data for each field is divided into five segments.

As another example, with respect to the D2 format VCR, in the NTSC system the number of valid picture elements per horizontal period is 768 and the number of valid scanning lines per field is 255, as shown in FIG. 1B. The valid video data for each field is divided into three segments.

In the D1 and D2 formats, various processes such as data element shuffling and error correction encoding are performed. FIGS. 2A and 2B are schematic diagrams showing how each picture data element is distributed to one of a plurality of heads. In the D1 format, as shown in FIG. 2A, four rotating heads, denoted with numerals 0, 1, 2, and 3, are used. On the other hand, in the D2 format, as shown in FIG. 2B, two rotating heads denoted with numerals 0 and 1, are used. Hereinafter, signal paths for the respective heads will be referred to as "channels".

FIGS. 2A and 2B show the channel numbers that are applicable to picture data elements of an even-numbered field of a video signal. For picture data elements of odd-numbered fields, the channel numbers of the even-numbered segments are as shown in the odd-numbered segments of FIGS. 2A and 2B and the channel numbers of the odd-numbered segments are as shown in the even-numbered segments of FIGS. 2A and 2B.

Since digital videotape recording entails handling of large quantities of data, most digital VCRs use a plurality of rotating heads. On occasion, magnetic heads get clogged. When a head gets clogged, all information in the channel corresponding to the head is lost. Therefore, it is customary to distribute recording data to a plurality of rotating heads in such a way that the effect of head clogging is minimized. As shown in FIGS. 2A and 2B, in the D1 and D2 formats, a scheme is used for distributing picture elements among the various channels so that a plurality of spatially adjacent picture elements are not simultaneously lost because of head clogging. In other words, even if a head clogs so that a picture element distributed to that head's channel is lost, the four picture elements which are above, below, and to the right and left of the lost picture element are distributed to other channels and so are not lost. Since the surrounding picture elements distributed to the other channels are properly reproduced, error correction can be accomplished by, for example, substituting the average value of the four surrounding picture elements for the lost element.

In recent years, in addition to the D1 and D2 formats for recording digital video signals, there has been proposed another type of digital VCR using a small rotating drum and a small tape cassette. This type of VCR requires a high performance encoding scheme to compress the large amount of data present in a digital video signal. Two dimensional transform encoding is an example of such a high performance encoding scheme. In two dimensional transform encoding, image data is divided into blocks consisting of, for example, 8×8 picture data elements and each block is orthogonally transformed. The transformed elements (referred to as coefficients) are broken down into components from DC to high frequency. Generally, the DC component is large, while the high frequency component is small. By assigning a proper number of bits to each coefficient, the total quantity of bits required for each block can be decreased. Recently the two dimensional discrete cosine transform (DCT) has become a favored transform for purposes of compression coding.

As an example of discrete cosine transformation, let it be assumed that an 8×8 block of image data samples is represented as follows:

| 139 | 144 | 149 | 153 | 155 | 155 | 155 | 155 |
| 144 | 151 | 153 | 156 | 159 | 156 | 156 | 156 |
| 150 | 155 | 160 | 163 | 158 | 156 | 156 | 156 |
| 159 | 161 | 161 | 162 | 162 | 155 | 155 | 155 |
| 161 | 161 | 161 | 161 | 160 | 157 | 157 | 157 |
| 162 | 162 | 161 | 163 | 162 | 157 | 157 | 157 |
| 162 | 162 | 161 | 161 | 163 | 158 | 158 | 158 | in which each number in this block represents the magnitude or signal level of the image data sample. When the discrete cosine transform of the 8×8 block of image data samples is derived, conversion coefficients $c_{ij}$ (i represents row number and j represents column number) are produced as follows:

| 314.91 | −0.26 | −3.02 | −1.30 | 0.53  | −0.42 | −0.68 | 0.33  |
|--------|-------|-------|-------|-------|-------|-------|-------|
| −5.65  | −4.37 | −1.56 | −0.79 | −0.71 | −0.02 | 0.11  | −0.33 |
| −2.74  | −2.32 | −0.39 | 0.38  | 0.05  | −0.24 | −0.14 | −0.02 |
| −1.77  | −0.48 | 0.06  | 0.36  | 0.22  | −0.02 | −0.01 | 0.08  |
| −0.16  | −0.21 | 0.37  | 0.39  | −0.03 | −0.17 | 0.15  | 0.32  |
| 0.44   | −0.05 | 0.41  | −0.09 | −0.19 | 0.37  | 0.26  | −0.25 |
| −0.32  | −0.09 | −0.08 | −0.37 | −0.12 | 0.43  | 0.27  | −0.19 |
| 0.65   | 0.39  | −0.94 | −0.46 | 0.47  | 0.30  | −0.14 | −0.11 | in which the number representing each conversion coefficient represents the relative power of that conversion coefficient. The conversion coefficient $c_{00}$ is referred to as the DC component and represents the mean luminance value of the image block. It is seen that the electric power of the DC component is significantly higher than that of the other components which are known as AC components. As i increases, the frequency of the AC components in the vertical direction increases and as j increases, the frequency of the AC components in the horizontal direction increases. As both i and j increase, the frequency of the AC components in the diagonal direction increases.

The DC component of the conversion coefficients exhibits the largest value and, thus, contains the most information. If the DC component is quantized with a large quantizing step, that is, if it is subjected to coarse quantization, block distortions are produced which appear as noise that is visually detected most readily in the video picture ultimately reproduced from the conversion coefficients, thereby deteriorating the quality of that picture. Consequently, to minimize such visual noise, the DC component of the conversion coefficients, namely $c_{00}$, is quantized with a small quantizing step and is represented by a larger number of bits, such as eight or more bits. A lesser number of bits may be used to represent the higher frequency AC components of the conversion coefficients $c_{ij}$ (where i, j ≠0) because higher frequency AC components represent changes in the video information of the n×n block and the human eye does not readily detect detail in a rapidly changing image. Consequently, an observer will not sense a loss of detail in that portion of an image which changes from point to point. Therefore, it is not necessary to represent the higher frequency AC components of the conversion coefficients with a large number of bits. This means that a larger quantizing step can be used to quantize the higher frequency AC components of the conversion coefficients. An example of quantizing the conversion coefficients set out above is as follows:

When a video signal which has been interlace-scanned is encoded within a frame by the DCT scheme, each block is made up of picture elements from corresponding respective portions of an odd field and an even field. In this in-frame encoding scheme, it is not possible to use the conventional channel distribution approach in which data elements from an even field are distributed differently from data elements of an odd field. Moreover, coefficient data which is generated by the two dimensional DCT contains components from DC to high frequency. Thus, the blocks of coefficient data do not have the spatial correlation which is found in the original image data blocks. In addition, if there is an error in only one coefficient in a block of coefficient data, this error affects the entire block. Interpolation for error correction is therefore not possible.

OBJECTS AND SUMMARY OF THE INVENTION

Accordingly, it is an object of the present invention to provide a method and apparatus for recording digital video signals in which a good quality reproduced image can be obtained in spite of errors in reproducing coefficient data because of head clogs and the like.

In accordance with an aspect of the present invention, in a method and apparatus for recording digital video signals in slant tracks on a magnetic tape by means of a plurality of magnetic heads disposed on a rotating drum about which the tape is wrapped, with each of the heads forming a respective one of the tracks during each rotation of the drum, an input digital video signal is divided into data blocks each composed of a plurality of picture elements. Each block of the input digital video data is compression-coded to form a block of coefficient data elements. The compression-coding includes an orthogonal transformation of the block of input data, and all elements of the block of coefficient data are recorded in a single one of the tracks.

| 315.00 | 0.00  | −3.00 | −1.00 | 1.00  | 0.00 | −1.00 | 0.00 |
|--------|-------|-------|-------|-------|------|-------|------|
| −6.00  | −4.00 | −2.00 | −1.00 | −1.00 | 0.00 | 0.00  | 0.00 |
| −3.00  | −2.00 | 0.00  | 0.00  | 0.00  | 0.00 | 0.00  | 0.00 |
| −2.00  | 0.00  | 0.00  | 0.00  | 0.00  | 0.00 | 0.00  | 0.00 |
| 0.00   | 0.00  | 0.00  | 0.00  | 0.00  | 0.00 | 0.00  | 0.00 |
| 0.00   | 0.00  | 0.00  | 0.00  | 0.00  | 0.00 | 0.00  | 0.00 |
| 0.00   | 0.00  | 0.00  | 0.00  | 0.00  | 0.00 | 0.00  | 0.00 |
| 1.00   | 0.00  | −1.00 | 0.00  | 0.00  | 0.00 | 0.00  | 0.00 | in which the quantizing is analogous to "rounding off" the conversion coefficients.

In a practical transmission or recording scheme, the quantized conversion coefficients are encoded by variable length coding, such as Huffman coding or run-length coding which provides further data compression. For proper transmission or recording, additional signals, such as synchronizing signals, parity codes, and the like, are added to the variable length coded conversion coefficients.

The foregoing method and apparatus according to this invention are advantageous in that even if one of the magnetic heads gets clogged, the resulting error does not propagate to many other coefficient blocks, so that deterioration of the reproduced image can be avoided.

The above, and other objects, features and advantages of the present invention will be apparent from the following detailed description thereof which is to be read in connection with the accompanying drawings.

BRIEF DESCRIPTION OF THE DRAWINGS

FIGS. 2A and 2B are schematic diagrams showing channel distribution of picture elements in conventional digital video signal recording formats;

DETAILED DESCRIPTION OF THE PREFERRED EMBODIMENTS

Figure 1B:
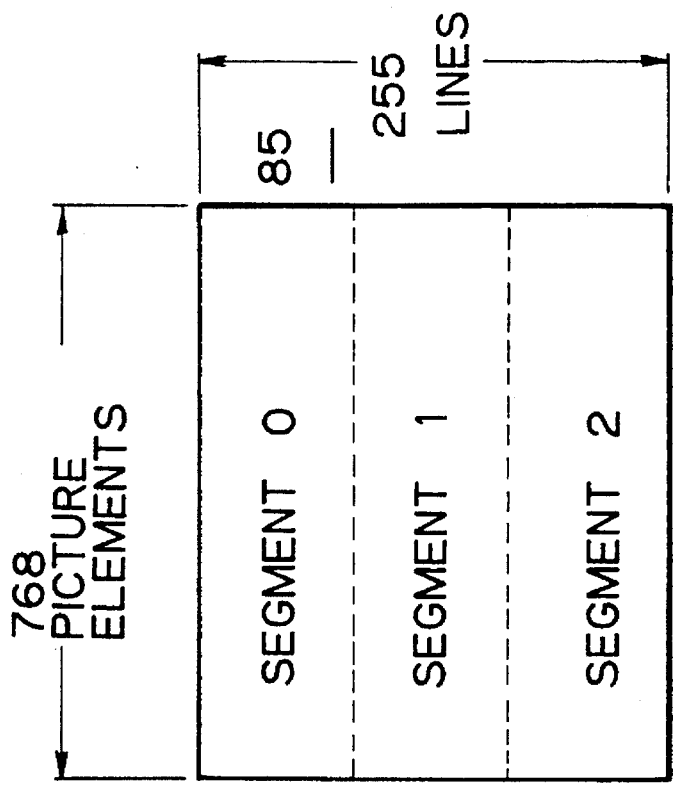
FIGS. 1A and 1B are schematic diagrams showing the number of effective picture elements per field in conventional digital video signal recording formats.
Figure 1A:
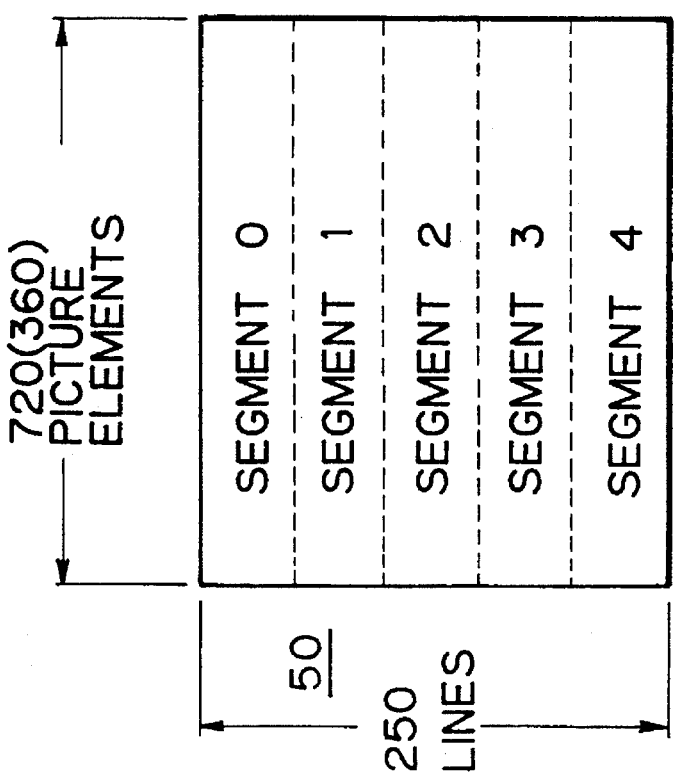
Figure 3:
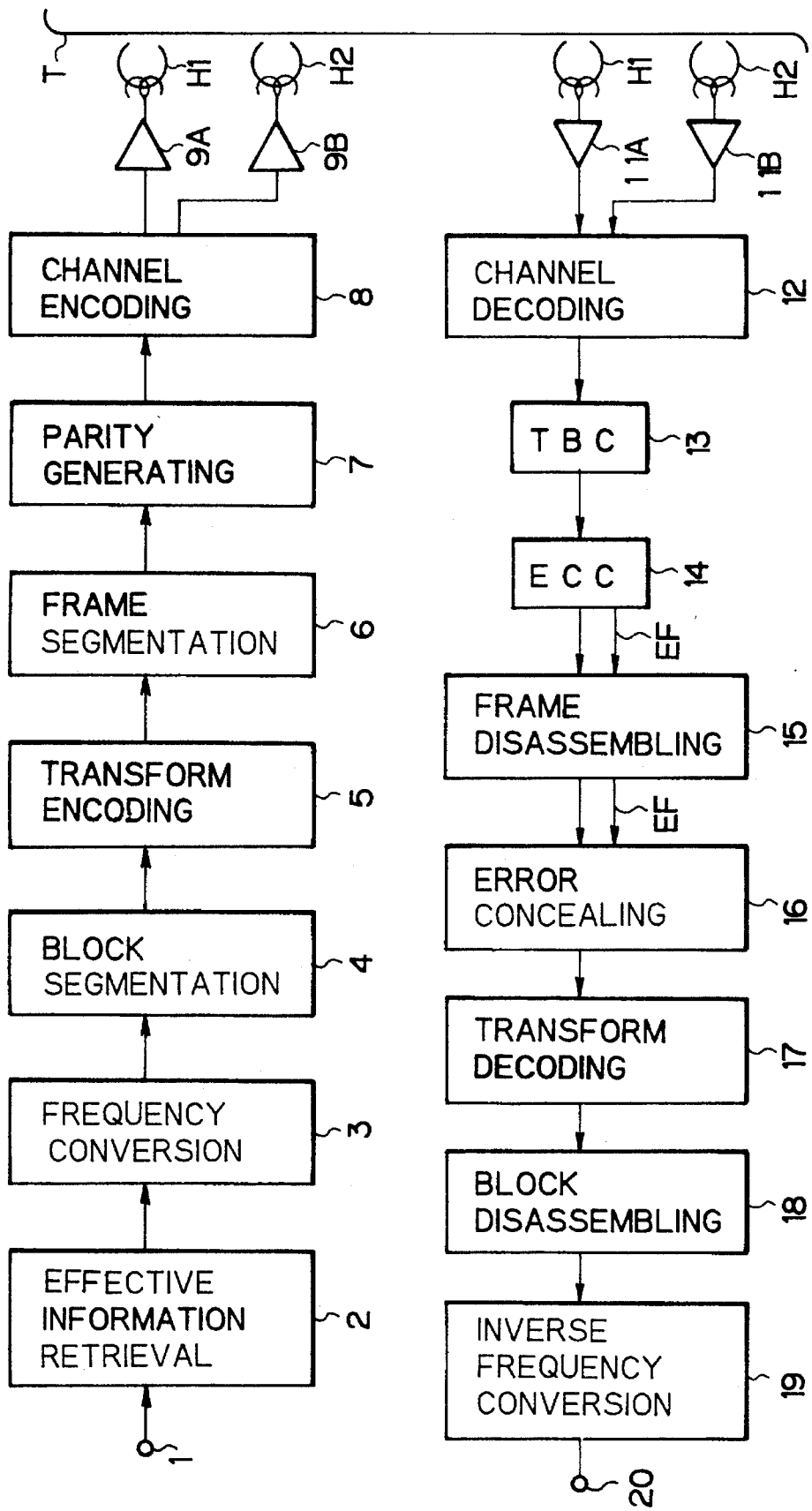
FIG. 3 is a block diagram of the signal processing portions of a recording circuit and a playback circuit in a digital VCR in accordance with an embodiment of the present invention.

First, a signal processing portion of a recording circuit in a digital VCR according to an embodiment of the present invention will be described with reference to FIG. 3. In FIG. 3, reference numeral 1 identifies an input terminal for receiving a digital luminance signal Y and digital color difference signals R-Y and B-Y which are formed of three primary color signals R, G, and B and received from, for example, a color video camera. It will be assumed that the clock rates of the signals are the same as the frequencies of the component signals in the above described D1 format. In other words, the sampling frequency of the luminance signal Y is 13.5 MHz and that of the color difference signals R-Y and B-Y is 6.75 MHz, and there are 8 bits per sample. An effective information retrieval circuit 2 removes the data during the blanking intervals of the input video signal and retrieves only information in the effective area, so that the quantity of data in the signal is compressed.

The signal output by effective information retrieval circuit 2 is sent to a frequency conversion circuit 3, which halves the sampling frequency of the two color difference signals. In other words, the sampling frequency of the color difference signals is converted from 6.75 MHz to 3.375 MHz. Thus, the signal output from the frequency conversion circuit 3 is a 4:1:1 video signal.

The output signal from the frequency conversion circuit 3 is supplied to a block segmentation circuit 4. The block segmentation circuit 4 converts the received data from raster scanning sequence to block sequence. The block segmentation circuit 4 is provided to condition the data for processing by a transform encoding circuit 5 disposed at a later stage of the recording circuit.

Figure 4A:
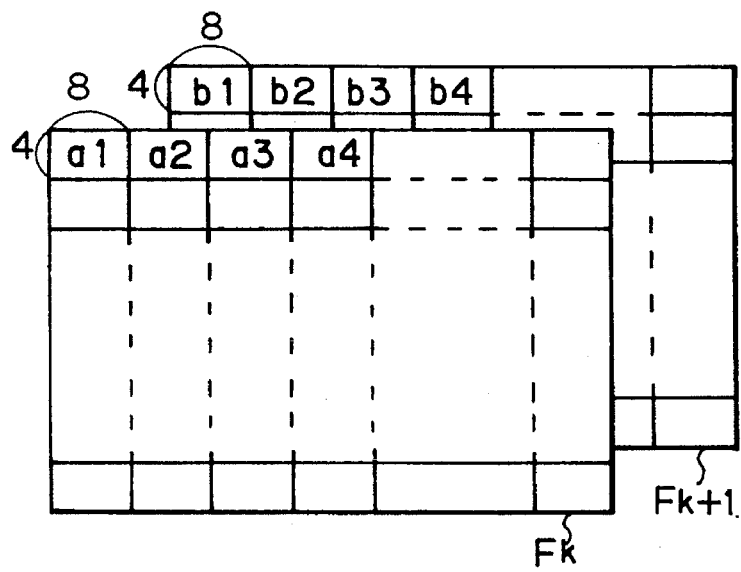
FIGS. 4A to 4E are schematic diagrams that illustrate a block forming process and a recording method in accordance with the present invention.
Figure 4B:
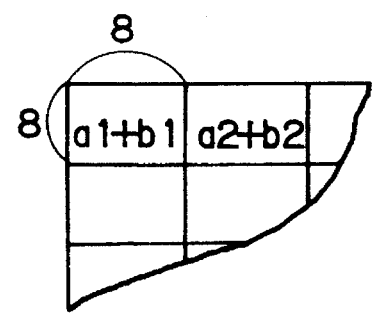

As shown in FIG. 4A, for purposes of block segmentation, a field Fk and an immediately succeeding field Fk+1 are divided into areas a1, a2, a3, . . . and areas b1, b2, b3 . . . , respectively. Each area is made up of 8×4 picture elements. A block of 8×8 picture data elements, as shown in FIG. 4B, is formed by using one area from each of fields Fk and Fk+1. The respective areas used, for example a1 and b1, occupy corresponding positions in the two fields. In this block segmentation scheme, since the transform encoding will be performed with respective areas of two fields having high correlation among the picture elements, greater data compression is achieved as compared to a conventional scheme using a block which consists of 8×8 picture elements in one field.

The transform encoding circuit 5 which receives the output signal of the block segmentation circuit 4 may be, for example, a DCT encoding circuit that includes a DCT transform circuit, a quantizing circuit, and a variable length encoding circuit. In order to improve the compression ratio, it is also possible to apply a frame difference encoding scheme or a motion compensation scheme in addition to the transform encoding.

The output signal from the transform encoding circuit 5 is supplied to a frame segmentation circuit 6. The frame segmentation circuit 6 converts the signal into data in a frame arrangement and mixes the transform encoded luminance signal and the two transform encoded color difference signals. The frame segmentation circuit 6 converts the data clock from that of the reproducing system into that of the recording system.

The output signal of the frame is supplied to a parity generating circuit 7, which generates parity codes for error correction. The output signal of the parity generating circuit 7 is supplied to a channel encoding circuit 8, which performs channel encoding so that the low band of the data to be recorded is decreased. The signal output from the channel encoding circuit 8 is supplied though recording amplifiers 9A and 9B and rotary transformers (not shown in the FIG.) to rotary magnetic heads H1 and H2 for recording on a magnetic tape T. The channel encoding circuit 8 also includes a circuit for distributing channel-encoded data to the heads H1 and H2.

For the sake of simplicity, there will not be discussed other types of data, such as PCM audio data, auxiliary subdata, tracking pilot signals, etc., which also may be included in the data to be recorded.

Figure 5A:
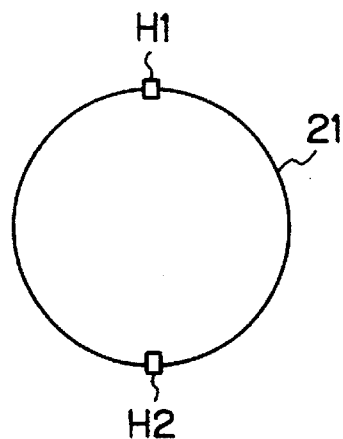
FIGS. 5A and 5B are schematic diagrams illustrating different dispositions of magnetic heads on a rotary drum.
Figure 5B:
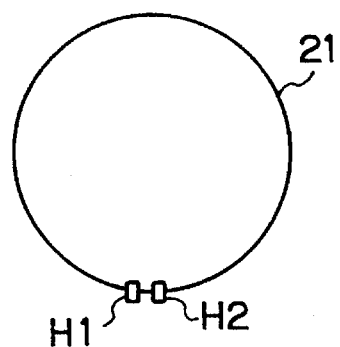

As shown in FIG. 5A, the magnetic heads H1 and H2 may be disposed in diametrically opposed positions on a rotating drum 21. Alternatively, as shown in FIG. 5B, the magnetic heads H1 and H2 can be mounted on the drum 21 adjacent each other in a unified construction. A magnetic tape (not shown in either FIG. 5A or 5B) is wrapped obliquely on the peripheral surface of drum 21 with a winding angle of approximately 180°. In the NTSC system the drum is rotated at a speed of, for example, 9,000 rpm. With the head locations shown in FIG. 5A, the magnetic heads H1 and H2 are alternately in contact with the magnetic tape. On the other hand, with the heads located as shown in FIG. 5B, both of the magnetic heads H1 and H2 scan the magnetic tape at the same time.

Figure 5C:
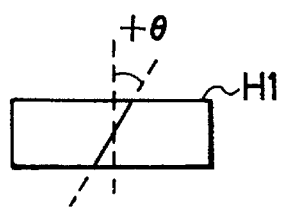
FIG. 5C is a schematic diagram showing the azimuth angles of the magnetic heads.
Figure 5C:
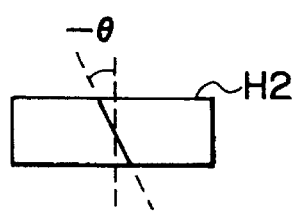

The directions of the magnetic gaps of heads H1 and H2 differ from each other; that is, the heads H1 and H2 have different azimuth angles. For example, as shown in FIG. 5C, azimuth angles of ±θ (for example, ±20°) are given to the magnetic heads H1 and H2, respectively. With the difference of the azimuth angles, there is an azimuth loss during playback so that the amount of crosstalk between adjacent tracks is reduced.

Figure 4C:
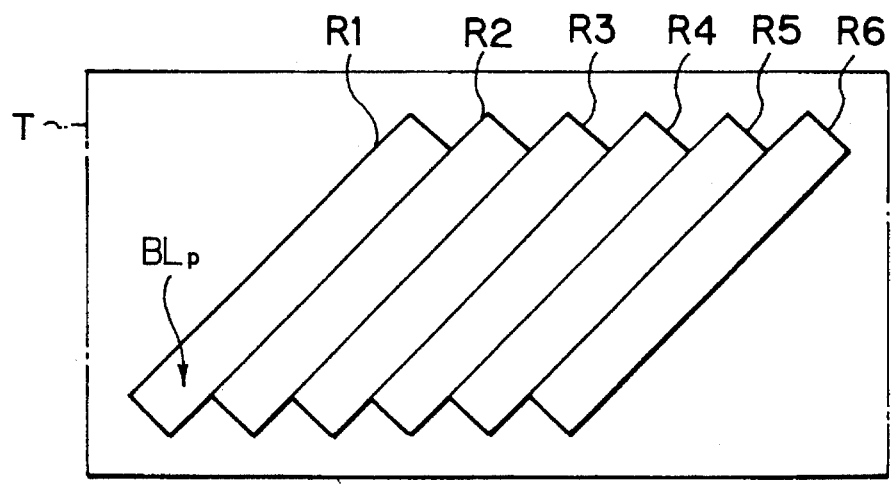

As shown in FIG. 4C, slant tracks R1, R2, R3 and so forth are successively formed by the magnetic heads H1 and H2. For example, odd-numbered tracks R1, R3, R5, and so forth are formed by the magnetic head Hi and even-numbered tracks R2, R4, R6 and so forth are formed by the magnetic head H2. As noted before, each block of the video data is transformed by a transform encoding scheme into an 8×8 block of coefficients $c_{ij}$, i and j being integers that are greater than or equal to 1 and less than or equal to 8. Then quantizing, run length and variable length encoding, or the like, parity coding, and so forth are carried out with respect to the block of coefficients $c_{ij}$ to produce a block BLp of data that is an encoded representation of coefficient $c_{ij}$. In a preferred embodiment of the invention, an 8×8 block of quantized coefficients is scanned for the purpose of run length and variable length encoding according to the zig-zag scanning path shown below:

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Figure 4D:
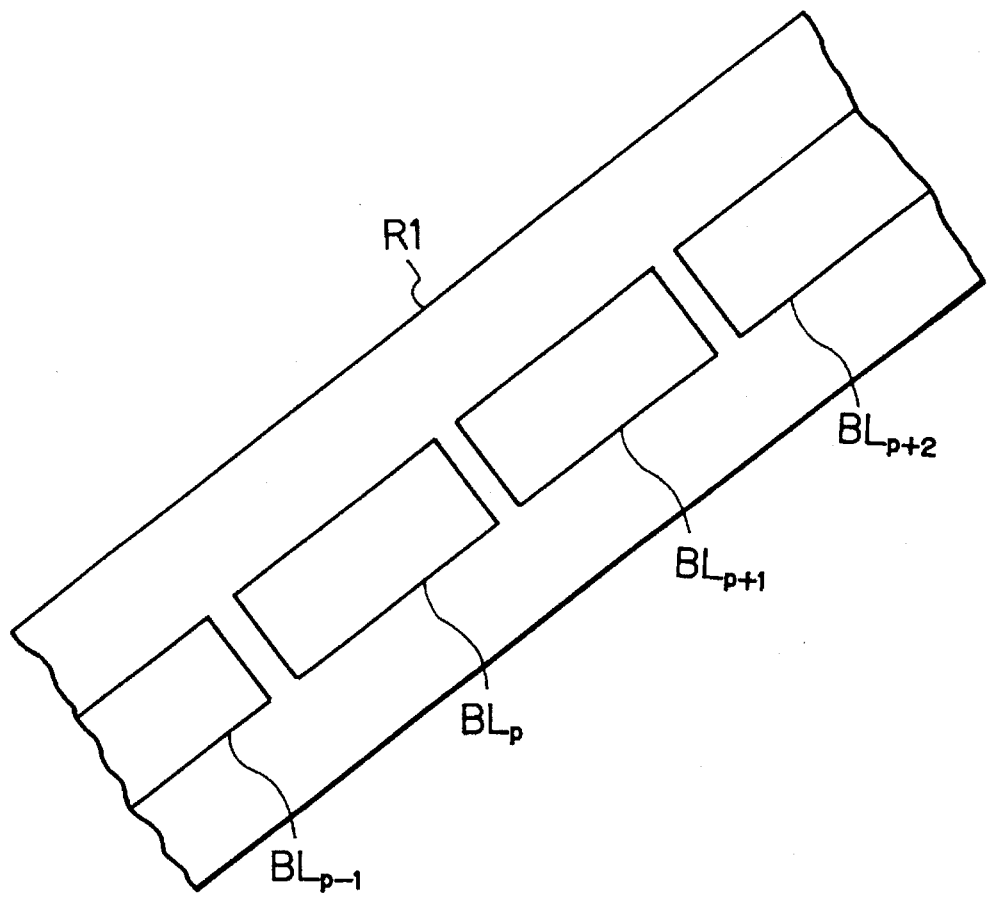
Figure 4E:
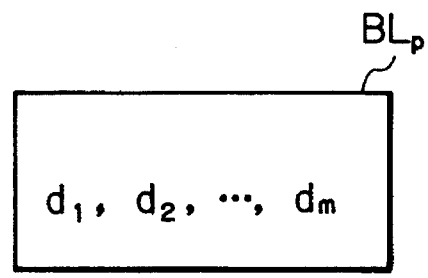

As schematically shown in FIG. 4C, all of block BLp is recorded in a single track R1. A portion of track R1 is schematically shown in FIG. 4D. According to a preferred embodiment of the invention, entire blocks BLp−1, BLp, BLp+1, BLp+2 are recorded in sequence along track R1. Block BLp is schematically illustrated in 4E and consists of data elements $d_1, d_2, \ldots d_m$. It will be appreciated that these elements may include synchronization codes, parity codes, and coded representations of coefficients $c_{ij}$. With quantization and run length encoding, as discussed above, there need not be a direct correspondence between each coefficient $c_{ij}$ and a data element $d_i$ of block BLp. Thus m, which is the number of elements $d_i$ in block BLp, may be less than (or greater than) 64, which is the number of coefficients $c_{ij}$. Nevertheless, as noted above, block BLp comprises data that is a coded representation of coefficients $c_{ij}$, and may therefore be referred to as a block of coefficient data that includes a plurality of elements. All of the elements $d_i$ of a given block BL are recorded on a single track, i.e., by a single one of heads H1 and H2, and preferably are recorded in contiguous locations along the track, as shown in FIGS. 4D and 4E.

It will also be appreciated that with variable length encoding, the number of bits making up each data element $d_i$ may vary within each block BL, and that with run length encoding the number of elements $d_i$ in a block may vary from block to block.

When the video data is recorded in this way, errors in the coefficient data due to clogging of one head and the like do not propagate. By contrast, when the conventional channel distribution approach is used for coefficient data, errors in reproduction of the coefficient data propagate to many other coefficient data blocks. As noted before, an error in one coefficient of a block affects the entire block. Thus, propagation of errors causes significant deterioration in image quality. Recording of coefficient data in accordance with the present invention prevents propagation of errors in coefficient data caused by head clogging and inhibits the effect of such errors upon image quality.

Further, when an 8×8 block consisting of picture elements of a single field is used for transform encoding, the entire block is adversely affected by a single error. However, using an 8×8 block made of corresponding respective 8×4 areas of two successive fields, as shown in FIG. 4B, limits the adverse effects to that 8×4 area.

Now referring again to FIG. 3, the signal processing portion of the reproducing system will be described. Data reproduced by magnetic heads H1 and H2 is supplied through rotary transformers (not shown in the FIG.) and reproducing amplifiers 11A and 11b to a channel decoding circuit 12. The channel decoding circuit 12 channel decodes the data and the resultant output signal is sent to a TBC (time base correction) circuit 13 for removing time base fluctuating components from the reproduced signal.

Reproduced data output from the TBC circuit 13 is supplied to an error correction circuit (ECC) 14. ECC 14 corrects errors in the DCT coefficient data by using error correction codes. ECC 14 generates a flag EF for each 8×8 coefficient data block to indicate whether an error is present in the block. The flag EF is sent to the following circuits along with the reproduced data.

These output signals from ECC 14 are supplied to a frame disassembling circuit 15, which disassembles the reproduced signal into components and converts the data clock from that of the recording system into that of the reproducing system. Coefficient data output by frame disassembling circuit 15 is supplied to an error concealing circuit 16, which responds to the error flag EF by replacing erroneous data with data obtained by interpolating coefficient data of the same order contained in surrounding coefficient data blocks.

Data output from the error concealing circuit 16 is supplied to a transform decoding circuit 17, which includes a variable length decoding circuit and an inverse DCT circuit. The transform decoding circuit 17 decodes the coefficient data to provide blocks of picture data elements.

The decoded picture data which is output from the transform decoding circuit 17 is supplied to a block disassembling circuit 18 which converts the decoded data from the block sequence to a raster scanning sequence, thereby reversing the function performed by the block segmentation circuit 4 of the recording system. The error concealment process, transform decoding process and block disassembling process are performed for each of the luminance signal and the two color difference signals.

The raster scanning sequence data output from the block disassembling circuit is sent to an inverse frequency conversion circuit 19. An interpolating circuit that is part of the inverse frequency conversion circuit 19 provides interpolated color difference data so that the frequencies of the two color difference signals R-Y and B-Y are restored to 6.75 MHz. Thus, a 4:2:2 component video signal is provided at an output terminal 20 of the inverse frequency conversion circuit 19.

Although the recording system described above includes two magnetic heads, it should be appreciated that the present invention can be applied to digital video recording systems in which three or more magnetic heads are used.

When coefficient data is recorded in accordance with the present invention in a VCR that includes a plurality of magnetic heads, even if there is clogging or a dropout in one magnetic head, the resulting error does not propagate widely. Instead, the error is restricted to a part of the image so that over all a high quality image can be obtained. In addition, when a video signal is reproduced in a "picture-in-shuttle" mode, the inclination of the scanning path of the magnetic heads does not match the inclination of the tracks, so that only part of the data can be obtained for reproduction. Even so, since entire blocks can still be reproduced, the image quality in this special reproducing mode is improved.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A method of recording digital video signals in slant tracks on a magnetic tape by means of a plurality of magnetic heads disposed on a rotating drum about which said tape is wrapped, said heads each forming a respective one of said tracks during each rotation of said drum, the method comprising the steps of:

forming said digital video signals into n×n blocks of picture data elements, n being an integer greater than 1, each said block of picture data elements being formed of a contiguous n×(n/2) area of a first field and a corresponding contiguous n×(n/2) area of an immediately following field of said digital video signals;

compression-coding each said block of picture data elements to form a block of coefficient data that includes a plurality of elements, the compression-coding including an orthogonal transformation of said block of picture data elements; and recording all elements of said block of coefficient data in a single one of said slant tracks.

2. A method as in claim 1; wherein n is an even number.

3. A method as in claim 2; wherein n=8.

4. A method as in claim 1; wherein said orthogonal transformation is a two dimensional discrete cosine transform.

5. A method as in claim 1; wherein said all elements of said block of coefficient data are recorded in contiguous locations along said single one of said slant tracks.

6. A method of recording digital video signals in slant tracks on a magnetic tape by means of a plurality of magnetic heads disposed on a rotating drum about which said tape is wrapped, said heads each forming a respective one of said tracks during each rotation of said drum, the method comprising the steps of:

forming from said digital video signals an n×n block of picture data elements, n being an integer greater than 1, said block of picture data elements being formed of a contiguous n×(n/2) area of a first field and a corresponding contiguous n×(n/2) area of an immediately following field of said digital video signals;

compression-coding said block of picture data elements to form a block of coefficient data that includes a plurality of elements, the compression-coding including an orthogonal transformation of said block of picture data elements; and using a single one of said magnetic heads to record all elements of said block of coefficient data in the respective track formed by said one head.

7. A method of recording digital video signals in slant tracks on a magnetic tape by means of a plurality of magnetic heads disposed on a rotating drum about which said tape is wrapped, said heads each forming a respective one of said tracks during each rotation of said drum, the method comprising the steps of:

receiving digital video input signals that include a luminance signal obtained at a first sampling frequency, a first color difference signal obtained at a second sampling frequency, and a second color difference signal obtained at a third sampling frequency;

retrieving data from valid portions of said digital video input signals to obtain valid input signals;

converting said first and second color difference signals to a fourth sampling frequency that is lower than said second and third sampling frequencies;

dividing fields of said valid input signals, as sampling frequency converted, into picture element areas;

forming an n×n block of picture data elements, n being an integer greater than 1, comprised of picture data elements from a contiguous n×(n/2) area of said picture element areas of a first field and a corresponding contiguous n×(n/2) area of said picture element areas of an immediately following field of said valid input signals;

compression-coding said block of picture data elements to form a block of coefficient data that includes a plurality of elements, the compression-coding including an orthogonal transformation of said block of picture data elements; and recording all elements of said block of coefficient data in a single one of said slant tracks.

8. A method as in claim 7; wherein the ratio of said first, second and third sampling frequencies is 4:2:2.

9. A method as in claim 8; wherein the ratio of said second sampling frequency to said fourth sampling frequency is 2:1.

10. An apparatus for recording digital video signals in slant tracks on a magnetic tape, comprising:

a rotary drum about which said tape is wrapped;

a plurality of magnetic heads disposed on said drum, for each forming a respective one of said tracks during each rotation of said drum;

means for forming, from said digital video signals, an n×n block of picture data elements, n being an integer greater than 1, said block of picture data elements being formed of a contiguous n×(n/2) area of a first field and a corresponding contiguous n×(n/2) area of an immediately following field of said digital video signals;

means for compression-coding said block of picture data elements to form a block of coefficient data that includes a plurality of elements, said compression-coding means including means for performing an orthogonal transformation on said block of picture data elements; and means for supplying all said elements of the block of coefficient data to one of said heads for recording in a single one of said slant tracks.

11. A method as in claim 10; wherein n is an even number.

12. An apparatus as in claim 11; wherein n=8.

13. An apparatus as in claim 10; wherein said means for performing an orthogonal transformation comprises means for performing a two-dimensional discrete cosine transform on said block of picture data elements.

14. An apparatus as in claim 10, wherein said all elements of said block of coefficient data are recorded in contiguous locations along said single one of said slant tracks.

15. An apparatus for recording digital video signals in slant tracks on a magnetic tape, comprising:

a rotary drum about which said tape is wrapped;

a plurality of magnetic heads disposed on said drum for each forming a respective one of said tracks during each rotation of said drum;

means for receiving digital video input signals that include a luminance signal obtained at a first sampling frequency, a first color difference signal obtained at a second sampling frequency, and a second color difference signal obtained at a third sampling frequency;

means for retrieving data from valid portions of said digital video input signals to obtain valid input signals;

means for converting said first and second color difference signals to a fourth sampling frequency that is lower than said second and third sampling frequencies;

means for dividing fields of said valid input signals, as sampling frequency converted, into picture element areas;

means for forming an n×n block of picture data elements, n being an integer greater than 1, from picture data elements in a contiguous n×(n/2) area of said picture element areas of a first field and a corresponding contiguous n×(n/2) area of said picture element areas of an immediately following field of said valid input signals;

means for compression-coding said block of picture data elements to form a block of coefficient data that includes a plurality of elements, said compression-coding means including means for performing an orthogonal transformation upon said block of picture data elements; and means for supplying all elements of said block of coefficient data to one of said heads so that said all elements are recorded in a single one of said slant tracks.

16. An apparatus as in claim 15, wherein the ratio of said first, second and third sampling frequencies is 4:2:2.

17. An apparatus as in claim 16; wherein the ratio of said second sampling frequency to said fourth sampling frequency is 2:1.

* * * * *